US011979634B2

(12) United States Patent
Hannes et al.

(10) Patent No.: US 11,979,634 B2
(45) Date of Patent: *May 7, 2024

(54) SOFTWARE BASED SYSTEM TO PROVIDE ADVANCED PERSONALIZED INFORMATION AND RECOMMENDATIONS ON WHAT WATCH TO VIEWERS OF VIDEO CONTENT (ON TV, ONLINE AND OTHER PLATFORMS)

(71) Applicants: Martin Hannes, Washington, DC (US); Hyekyu Lee, Burbank, CA (US)

(72) Inventors: Martin Hannes, Washington, DC (US); Hyekyu Lee, Burbank, CA (US)

(73) Assignee: KOVUE SYSTEMS LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/221,110

(22) Filed: Apr. 2, 2021

(65) Prior Publication Data

US 2022/0014820 A1  Jan. 13, 2022

Related U.S. Application Data

(62) Division of application No. 17/121,564, filed on Dec. 14, 2020.

(Continued)

(51) Int. Cl.
| | | |
|---|---|---|
| *H04N 21/235* | (2011.01) | |
| *H04L 51/10* | (2022.01) | |
| *H04L 51/52* | (2022.01) | |
| *H04L 67/561* | (2022.01) | |
| *H04N 21/25* | (2011.01) | |
| *H04N 21/45* | (2011.01) | |

(52) U.S. Cl.
CPC ......... *H04N 21/4532* (2013.01); *H04L 51/10* (2013.01); *H04L 51/52* (2022.05); *H04L 67/561* (2022.05); *H04N 21/2353* (2013.01); *H04N 21/251* (2013.01)

(58) Field of Classification Search
CPC .............................. H04N 21/40; H04N 21/20
See application file for complete search history.

(56) References Cited

U.S. PATENT DOCUMENTS 8,365,213 B1 * 1/2013 Orlowski ........... G06Q 30/0251
725/15
9,204,197 B2 * 12/2015 Kim .................. H04N 21/4756
(Continued)

*Primary Examiner* — Mushfikh I Alam
(74) *Attorney, Agent, or Firm* — McCarter & English, LLP; James M. Smedley; Alex Korona

(57) ABSTRACT

The present invention relates generally to a sophisticated system and software to assist users deciding what video programing to watch. Based on analysis of viewing by users and their friends (which are the most reliable and accurate influencers on peoples viewing decisions), the system provides tools, ratings, recommendations and alerts. Specifically, the system leverages various forms of unique software tools and artificial intelligence processing to produce accurate and relevant information for users deciding what to watch. Given the huge and expanding amounts of video content and multiple viewing platforms, finding out what to watch is a crucial problem for a very high percentage (over 80%) of all video viewers, and the current invention represents a crucial and timely solution to this problem.

20 Claims, 4 Drawing Sheets

Related U.S. Application Data

(60) Provisional application No. 62/947,093, filed on Dec. 12, 2019.

(56) References Cited

U.S. PATENT DOCUMENTS

| | | | | |
|---|---|---|---|---|
| 10,455,281 | B2* | 10/2019 | Oztaskent | H04N 21/4394 |
| 11,176,484 | B1* | 11/2021 | Dorner | G06F 16/738 |
| 11,375,256 | B1* | 6/2022 | Dorner | G06N 3/0454 |
| 2013/0278828 | A1* | 10/2013 | Todd | H04N 21/2343 |
| | | | | 348/E5.099 |
| 2014/0007152 | A1* | 1/2014 | Pora | H04N 21/4394 |
| | | | | 725/18 |
| 2014/0344861 | A1* | 11/2014 | Berner | H04N 21/4826 |
| | | | | 725/46 |
| 2014/0359647 | A1* | 12/2014 | Shoemake | H04N 21/44008 |
| | | | | 725/10 |
| 2015/0067724 | A1* | 3/2015 | Johnson | H04N 21/4668 |
| | | | | 725/32 |
| 2015/0365722 | A1* | 12/2015 | Oztaskent | G06F 16/7834 |
| | | | | 725/18 |
| 2016/0150294 | A1* | 5/2016 | Phatak | H04N 21/4126 |
| | | | | 725/23 |
| 2016/0227266 | A1* | 8/2016 | Shaw | H04N 21/4383 |
| 2016/0249115 | A1* | 8/2016 | Lincke | H04N 21/233 |
| 2017/0180798 | A1* | 6/2017 | Goli | H04N 21/2407 |
| 2018/0007431 | A1* | 1/2018 | Sidhu | H04N 21/42203 |
| 2018/0316944 | A1* | 11/2018 | Todd | H04N 21/6587 |
| 2020/0389705 | A1* | 12/2020 | Harris | G06Q 10/10 |
| 2021/0037287 | A1* | 2/2021 | Ha | H04N 21/4728 |
| 2021/0084369 | A1* | 3/2021 | Neumeier | H04N 21/4394 |
| 2021/0211779 | A1* | 7/2021 | Wu | H04N 21/23439 |
| 2023/0403422 | A1* | 12/2023 | Liu | G01S 1/08 |

\* cited by examiner

SOFTWARE BASED SYSTEM TO PROVIDE ADVANCED PERSONALIZED INFORMATION AND RECOMMENDATIONS ON WHAT WATCH TO VIEWERS OF VIDEO CONTENT (ON TV, ONLINE AND OTHER PLATFORMS)

CROSS-REFERENCE TO RELATED APPLICATIONS

This application is related to a prior application, U.S. patent application Ser. No. 17/121,564, filed on Dec. 14, 2020, by the same inventors (Martin Hannes and Hyekyu Lee), which shares many of the same system elements and processes as the following, and which is hereby incorporated by reference in its entirety.

FIELD OF THE INVENTION

The present invention relates generally to a system and software applications used to determine automatically what video content or programs a user is watching and share the information in real-time with a selected group of friends and users.

More specifically, the present invention is a system and software to identify and analyze video content viewed by an individual user and share this information including ratings and viewing histories with individual friends and related users. This System significantly simplifies any decision on what to view and creates a truly social connection around what to watch across all available content platforms.

BACKGROUND OF THE INVENTION

With the rapid growth of new content platforms and huge amounts of content now available to consumers, deciding what to watch has become a major and frustrating issue for consumers. In this regard, it has become an almost impossible task for consumers (viewers) to find out what to watch across all these various content platforms. The average content viewer now spends up to one hour per day scrolling through menus, lists and program schedules trying to find out what they would like to watch—a very frustrating experience.

Although individual content platforms have tried various recommendations systems (engines) to help users find appropriate content on their own platforms, these do not work well and only reflect programming on that platform. Users are generally dissatisfied, and many find these so inaccurate they have just stopped using them. The system described in the following addresses these viewer issues by instantly providing much more accurate and relevant program content recommendations to the user.

The system uses individual viewing information from related users (including friends, family and close associates) recorded automatically to provide the user with both real-time and historical information on what their friends are watching and what they think as a basis for personally deciding what to watch. Based on private market research, friends' viewing history and recommendations are nearly twenty times more likely to be the most accurate and relevant method of finding out what to watch.

To achieve the most valuable and relevant information for users making decisions on what to watch, the system gathers information from various sources that are directly linked to that individual and from large numbers of related users, also directly linked to those users. These include current viewing, duration of viewing, repeat viewings, auto ratings, prompted ratings and recommendations. The system also incorporates text and voice messaging functions to allow users to discuss content with individuals or groups in real-time. Separately, the System provides users with historical viewing lists for all related users that can be viewed by individual or particular show as well as related information on the program. Additional analysis performed by the system reinforces and augments users' ratings measures.

The incentive to use the system is to create a social network with your own friends around TV and video viewing and to share and learn about new content which is otherwise so difficult to find across so many new platforms and delivery options. Nearly 30% of all social media communications today are already built around content viewing and this echoes the age-old tradition of the morning "office water cooler discussion" about last night's TV viewing and what programs to watch. The System automates all this and provides a simple and efficient way to decide what to watch at any time when you want to watch.

Existing solutions for recommended viewing focus on algorithmic forecasts based on a combination of general population's viewing (universal content ratings) and user histories of viewing different types and genres of content. However, in practice, these backward-looking systems have proven ineffective in finding relevant and new viewing content for the large majority of viewers. On the other hand, the system described in this application uses current and real-time viewing information from closely related users (friends) to create real-time solutions to help consumers decide what to watch over multiple platforms.

SUMMARY OF THE INVENTION

The current invention is unique in its approach to creating viewing suggestion and recommendations in that rather than using algorithmic analysis of a user's prior viewing history, this system uses automated analysis of current and historical viewing of related users to create much more relevant and accurate viewing options for the user. Accordingly, the invention incorporates a computer implemented software system and device applications to identify and record a user's viewing information on all platforms to record and share this information with related users (friends, family and others). To identify a user's viewing, the system uses various forms of audio fingerprinting of viewed content which is matched against fingerprint databases to identify content, and if the content cannot be automatically identified, the system prompts the user to confirm a program title via a manual input.

The program title information is then augmented from program metadata on the system and shared with the user and related users. In addition, in a preferred embodiment of the invention, the system stores historical viewing information by user and related users to show what programs friends are and have been watching including repeat viewings. This information is displayed on the user device application to aid the user in deciding what to watch. (As noted previously, consumer research has strongly identified friends and family as the overwhelming source of valued program recommendation and suggestions on what to watch—considerably more than unrelated algorithmic or system generated suggestions.)

Separately, in a preferred embodiment of the system, as users and their friends continue to use the system and more viewing data and related information is recorded by the software, additional user viewing analysis is performed by the software on the backend servers. The system uses various forms of artificial intelligence programs to provide more relevant and useful information to the user to help rank suggestions and recommendations from viewing friends and associates. Particular forms of information include propensities of related users (friends) to influence the viewing of an individual (become a personal influencer), and the system provides a comparative viewing index based on how closely a friend's current and historical viewing compares with that of the original user.

A separate embodiment of the system incorporates different forms of specific program ratings, both system prompted and automatic. System prompted ratings utilize on-screen pop-ups and other device alerts to encourage the user to get the user to make simple one-button program ranking entries about current viewed programs. These ratings are instantly shared with all other related users (friends). In addition, the System itself creates automatic ratings for any specific viewed program by related users by analyzing data on related users viewing including: time spent viewing a specific program, number of repeat viewings and information derived from sentiment analysis of related communications between related users on the platform.

In a preferred embodiment of the invention, the system also promotes various forms of direct viewing recommendations from related users to assist users in deciding what to watch. These include shared recommendations from related users as well as derived recommendations developed by the system based on viewing information automatically collected from those same users. In the first instance, the system prompts a user in real-time to provide recommendations on programs they are watching via a simple click for pre-formated responses. In the second instance, the system automatically analyzes past and present viewing by each individual user for that particular program content currently being viewed by the user and or related users and creates automatic recommendations responses. Recommendations are then immediately sent as messages and alerts to all related users' devices (incorporating the previously calculated comparative viewing index for the sender) so that a user can take action immediately (if necessary) to view any recommended programs.

Another preferred embodiment of the invention incorporates sentiment analysis of users' communications to create additional information on preferred viewing for users on the system network. As the system incorporates both in-app text messaging and voice communications, the messaging between users is analyzed from stored data using key-word and other artificial intelligence software to identify specific content (programs) being discussed between users and determine both the direction (positive or negative) and level of intensity (interest levels) for these specific programs. The system software then automatically creates a sentiment score for individual programs which is communicated with all of the related users (friend's group). This sentiment score represents another important influencer tool in assisting a user to decide what to watch.

In another preferred embodiment of the invention, system application software creates different, unique forms of program rankings lists for the user (lists of preferred programs) based on individual profiles set up by the user which are continually updated in real-time and adjusted for similar related users' viewing. These include alternate rankings types based on a variety of factors including: relationships with other users and their viewing (comparative viewing rankings), user demographics (age, gender, other), program genre interests (sports, documentaries, other genres), viewer location, and type of viewing (individual vs group or other). The user can also set up one or more individual viewing profiles to match what they want to view at a point in time. The system then creates specific viewing lists which are consistent with these profiles or apply these profiles as an additional filter on rankings already derived from friends' viewing and recommendations provided by the system.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED DESCRIPTION OF THE INVENTION

A better understanding of the disclosed embodiments will be obtained from the following detailed descriptions and accompanying illustrations. All illustrations of the drawings are for the purpose of describing selected versions of the present invention and are not intended to limit the scope of the present invention.

Embodiments of the present invention are directed to providing systems and software, including applications installed on user smartphones, PC's, laptops, tablets and other similar devices, to identify viewing by the user and friends on the network and analyze, share and compare this information to provide the best possible suggestions/recommendations on what to watch across any of the networks which the user may have access to. In addition, because the solution relies on social interaction between friends, users are encouraged to use the system regularly and invite more friends to install the application on their devices. In this way the system collects more viewing information which enhances the user experience and relevance of the information in assisting users to make decisions on what to watch across all their content platforms or even new platforms they might not currently subscribe to.

Figure 1:
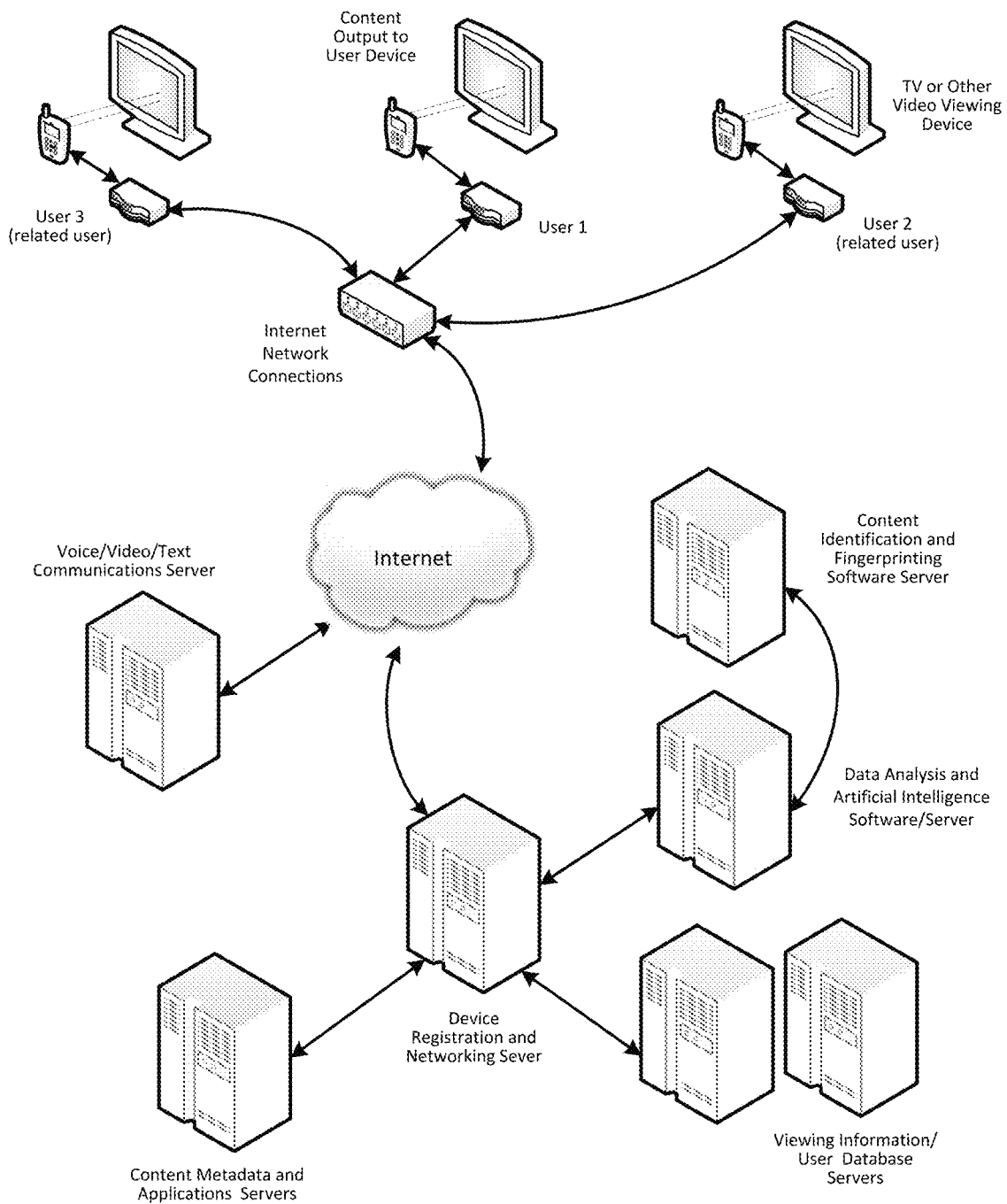
FIG. 1 is a diagram of a typical set-up for the collection and sharing of viewing information between related users and the key devices and systems involved in accordance with an embodiment of the present invention.

Turning now to FIG. 1, an exemplary embodiment of the key elements, devices and data systems, in accordance with an embodiment of the present invention, is shown. According to an embodiment of the invention, the system incorporates a consumer software application downloaded and installed on the consumer device which can include smartphones, PC's, tablets, smart TV's and TV connected equipment. This is integrated with the device operating software and the device audio recorder (in the case of the audio fingerprinting content recognition system). In this embodiment the device is then connected to cloud servers via an internet protocol network, and to the main backend systems servers and data storage servers. The system also includes content identification servers, communications system and networking servers, artificial intelligence systems and content metadata servers.

According to an embodiment of the present invention, when a user signs up for the social viewing application, the system prompts users to invite other related users (friends, family and others) to download the software application to share their viewing information with related users on the system's social network. From this point on, all viewing information, ratings and recommendations are automatically shared and updated with all members of the related users' group via system network connections to each user's device. Thereafter, once users begin to watch any video or television content, the system starts to monitor user viewing identifying content using automatic video content recognition (ACR) systems based on audio fingerprinting and other content identification technologies or direct user content title inputs.

In one specific embodiment of the present invention, the device application software monitors the user's viewing using the device microphone (or other audio monitor) to create fingerprints which are subsequently transmitted to the system servers. System software subsequently performs fingerprint comparisons against a reference database of fingerprinted video content and to determine a "match". The system also allows the alternative of on-screen user inputs to identify content, and will prompt the user to make an entry if the system software cannot identify specific content. As part of the process, the system incorporates program, network and other metadata information qualified by user profile other information to create a complete program profile including title, episode and viewing network information which is responded to the user device on the system network and recorded in the system database servers. In addition, although auto content identification using audio track data is one option for automatically identifying viewed content, other methods utilizing video output fingerprinting and similar systems are envisioned by this invention and would operate in a similar fashion in the system process.

In a common embodiment of the present invention, the system and device application also incorporate automatic and semi-automatic ratings options for each program being viewed by a user. In the first instance, the automatic ratings engine software uses the actual viewing times in minutes, percentage of total program run-time viewed as well as previous repetitive viewing to produce an estimated individual rating for a particular program. System ratings software then utilizes these inputs to create a combined estimated rating which is tagged to the user and recorded on the system database servers. In the second instance, system users are presented with a manual ratings option via an automatic on-screen prompt (pop-up) on their device once the user has viewed a significant proportion of the program. The user is asked to manually input a program rating for that show from a ratings scale displayed on the user device. The user ratings response which is likewise recorded on system database servers. In both cases the ratings information is tagged to a particular user and shared with other related users via the system network.

Separately, in an embodiment of the present invention, the application on the consumer device incorporates a number of types of on-platform communications including voice, video and text messaging. These systems are enabled to allow users to interface with each other regarding their views on specific programs including their views, ratings and program recommendations details. Software also monitors and records all on-platform communications in a computer readable database in real-time. System software uses this information and applies key-word analysis to identify communications related to specific viewed video content. These communications are tagged to individual users and related user groups. Artificial intelligence software then leverages other system data including individual viewing histories, ratings and program recommendations to categorize user communications and related content based on sentiment direction (positive or negative) and comment intensity. In doing this the software considers factors such as frequency and regularity of individuals viewing and viewing correlations between friends group members to develop a separate profile of the user groups' overall interest in a specific program or video content. The sentiment analysis data is recorded in a computer readable database and mapped in real-time to other program data on the database servers. The system then creates viewing lists and reports for users for specific content and programs provided to users as a tool to further assist viewing (what to watch) decisions.

In a further embodiment of the present invention, the system creates several forms of instant program recommendations to facilitate user choices on what video programs to watch. These include both system generated recommendations as well as prompted user recommendations for shows to watch. In the first instance, software in the system monitors user viewing based on factors such as duration of viewing, repeats viewings and other factors to estimate individual viewer enthusiasm for specific content and adds other relevant information such as other related users who viewed to automatically create system recommendations (suggestions). In the second instance, system software monitors current viewing by duration and repeat viewings to prompt user via on-screen messaging to make an entry of the user's recommendation for the current program. Subsequently, in both cases the recommendation messages and alerts are shared on the system network with any or all related users and recorded in system database servers.

In another preferred embodiment of the invention, the system allows users to create other more advanced and personalized forms of program rankings based on personal profiles set up by the user. Users can choose alternate rankings lists based on a range of factors including: relationships with other users, their comparative viewing ratings, user demographics (age, gender, other), program genre interests (sports, documentaries, other genres), viewer location, and type of viewing (individual vs group). The user can then add one or more individual viewing lists for different viewing schedules. Based on the user profiles and other content filters including program ratings, rankings and recommendation already in the system, the application software creates alternate suggested viewing lists for the user which are displayed on the user device screen.

In FIG. 1, embodiments of the present invention are shown. These incorporate key elements of the system and backend servers including, but not limited to; smartphones, PC's and tablets, smart TV's or connected TV devices all linked to the Internet via wired or wireless connections. These are all linked to backend cloud servers which incorporate multiple layers of device communications and application management software systems including: device application interface and control software, database servers and file management software, consumer text and voice communications databases, artificial intelligence and key word identifications software, data reporting and analytics software, and data storage servers.

One of ordinary skill in the art would appreciate that the system could be comprised of fewer components or additional components than those displayed in FIG. 1 that is provided for exemplary purposes.

Figure 2:
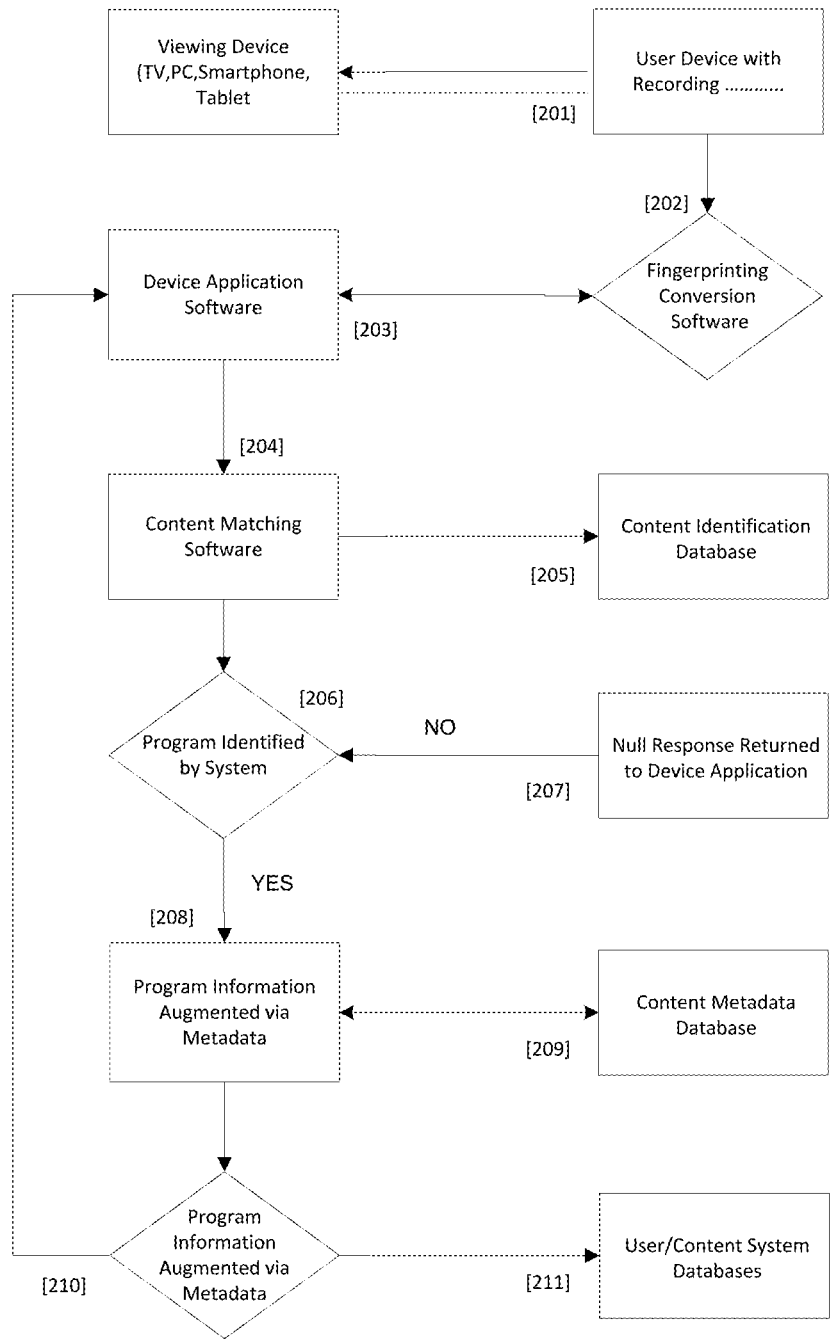
FIG. 2 is a system overview and process flow diagram showing an exemplary method in accordance with an embodiment of the present invention.

Turning then to FIG. 2, embodiments of the present invention are shown. These diagrams show the components and processes for the identification of viewed content including the monitoring of the audio track from the content viewing device and the subsequent identification systems including the interfaces between the consumer device application and system backend servers. In the first instance, in relation to the consumer device as shown in FIG. 2, the audio output from the user viewing device in step [201] is received by the device microphone and recorded by the system contemporaneously. Fingerprinting software in step [202] then analyzes the audio track and creates fingerprint data which is recorded and sent via the system device application in step [203] to a communications manager server which forwards the fingerprinting data in step [204] to the content matching server. The data is compared to fingerprinted program data on a content identification database in step [205] and identified in step [206]. If content cannot be identified it is returned as a 'null' response to the device application in step [207]. Otherwise, the matched content identification (title, other) is transmitted in step [208] to be augmented with additional program information from content metadata servers in step [209]. Information on these servers (which is regularly updated) includes: program titles, schedules, content networks, platforms, actors and cast as well as season and episode information. The new augmented data file for the viewed content (program) is then returned in step [210] to the device/application for display on the user device and recorded in step [211] to the user/content viewing database on the system.

This example incorporates an audio fingerprinting system for the automatic identification of user viewing as shown in FIG. 2, however, one of ordinary skill in the art would appreciate that the system could also incorporate other software-based content identification (ACR) systems which would perform in a similar manner to automatically identify program content.

Figure 3:
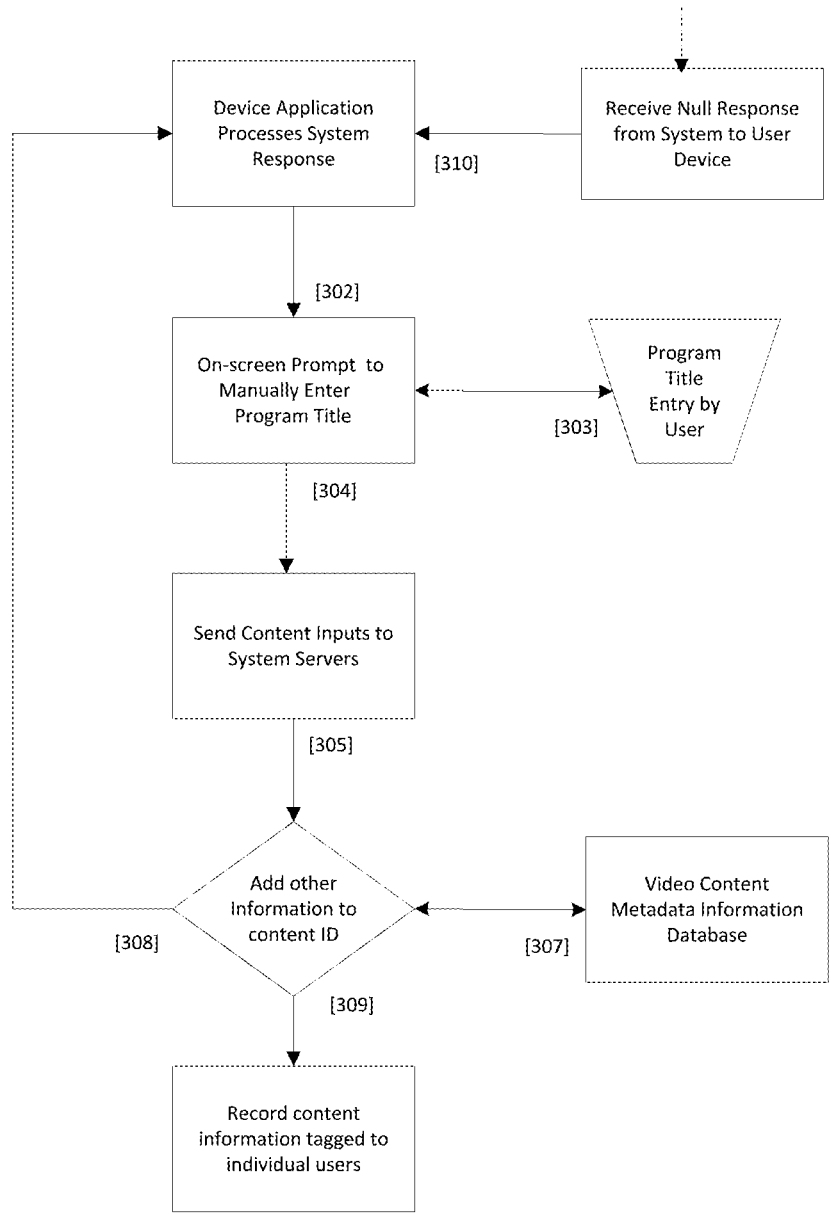
FIG. 3 is a process flow diagram showing an exemplary method in accordance with an embodiment of the present invention.

In FIG. 3, this embodiment if the system describes the process that results if the system cannot automatically identify the currently viewed program title in step [207] of the previous diagram, FIG. 2. The 'null' response is received by the user device application in step [301] which triggers an alert and on-screen prompt to request the user manually input the program title of the currently viewed content, in step [302]. The user enters the required information at step [303] which is forwarded at step [304] to system backend servers, as in the previous example in FIG. 2, for addition of additional program information in step [305]. Program metadata files are searched in step [306] to create a new augmented program file which is returned in step [307] to the device application for user device display and recorded in step [308] to the system user/content databases.

Figure 4:
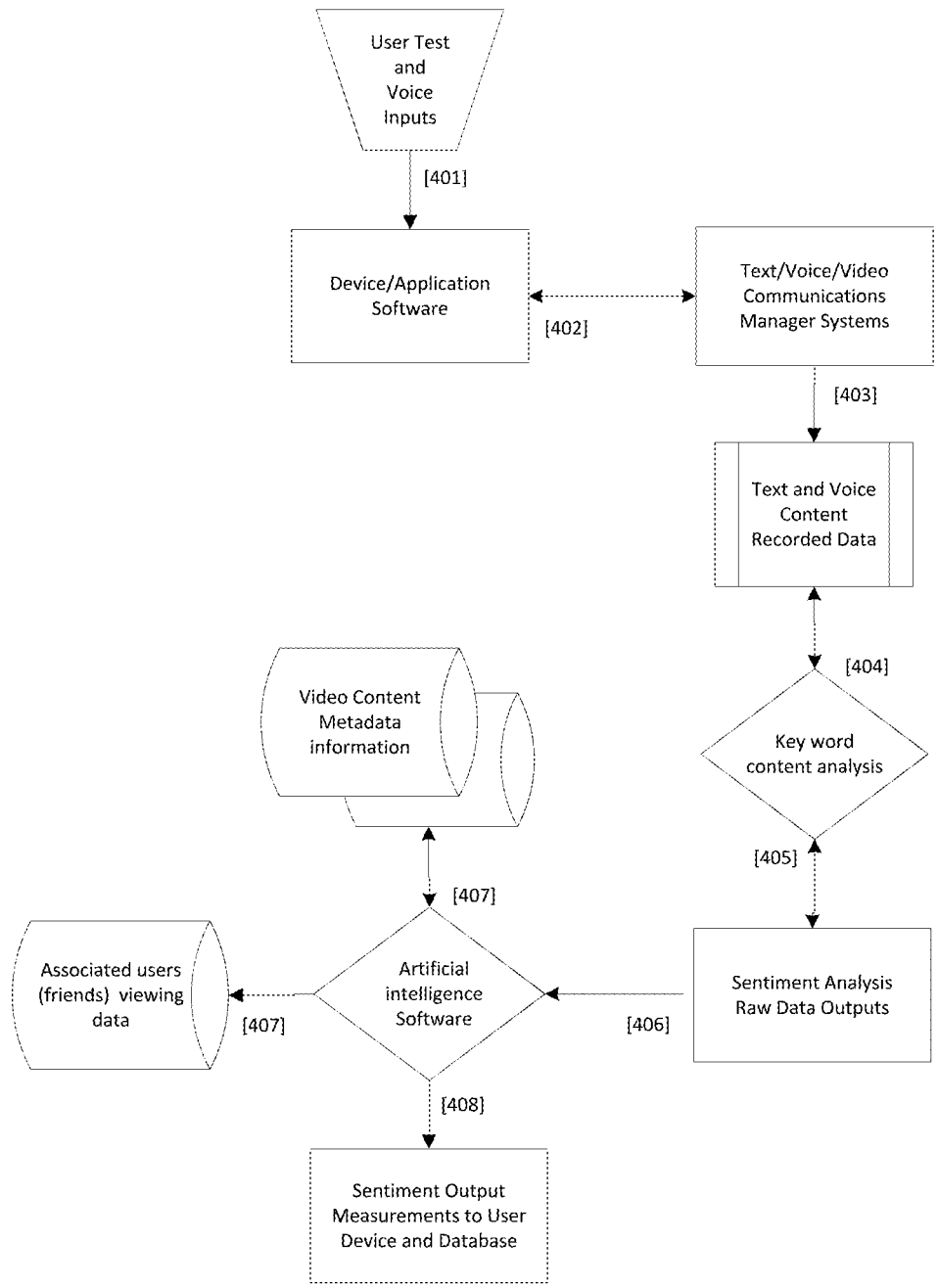
FIG. 4 is a process flow diagram showing an exemplary method in accordance with an embodiment of the present invention.

Turning to FIG. 4, this represents an embodiment of the invention describing an additional tool for creating a sentiment measurement for related users and content as an aid to the user in deciding what to watch. This includes mechanisms for processing and handling user sentiment data for individual programs based on positive or negative reactions to specific video content (programs). The device application allows users in step [401] then [402] to initiate voice, video or text communications with related users. Data reflecting communications between users is then recorded in step [403] onto a message content database. In step [404] this data is analyzed using special key-word analysis software to identify and sort communications related to specific user viewed programs. The data is then forwarded in step [405] to a sentiment analysis database and in step [406] processed by artificial intelligence software leveraging information from content metadata databases and related users historical viewing in steps [407] and [408]. The resulting outputs from this process (content sentiment scores) are shared with users as indicators to influence what to watch in step [409].

Throughout this disclosure and elsewhere, block diagrams and flowchart illustrations depict methods, apparatuses (ie systems), and computer software products. Each element of the block diagrams and flowchart illustrations, as well as each respective combination of elements in the block diagrams and flowchart illustrations, illustrates a function of the methods, apparatuses, and computer software products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software applications for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (ie. computing device) can receive such a computer program or software application and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer software instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a database may be comprised of one or more of a file storage system, relational data storage system or any other data system or structure configured to store data, preferably in a relational manner. In a preferred embodiment of the present invention, the data store may be a relational database, working in conjunction with a relational database management system (RDBMS) for receiving, processing and storing data. In the preferred embodiment, the data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Software and or program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable software code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer software instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular software programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A computer system and software module to identify real-time user video viewing data to enable sharing of viewing and other information with related users (friends and family) who are significant influencers of video content viewing, and provide multiple tools to system users to assist and simplify user decisions on what to watch, comprising:
    an application software module comprising computer executable code on a user mobile device of a user,
    a direct interface between the module and the user mobile device's operating system,
    a cloud based server configured to continuously monitor for and receive captured audio samples from the user mobile device, wherein said audio samples are captured by the user mobile device from content being viewed by the user,
    an internet protocol connection between individual user devices including the user mobile device and the cloud-based server,
    computer readable database servers for user viewing and system data recording,
    wherein the said software module, said internet protocol connections and databases are configured to:
        use system software on the cloud based server to identify the content being viewed in real-time by matching the captured audio sample to an audio track of the content stored in the database, wherein the system software responds to the application software on the user mobile device with viewing information about the identified content including program title, series and season information, content start and end time, content rating, and viewing platform (content provider),
        record viewing and related information by users to computer readable databases, and use actual viewing times in minutes, percentage of total program viewed, and previous repetitive viewing to produce an estimated individual rating for a particular program,
        tag viewing information by content title, user, related users, time and duration of viewing, and program rating for later computer analysis,
        automatically share the viewing information with the user's friends by transmitting the viewer information from the cloud based server to each friend's device via internet protocol network links,
        create a sentiment measurement based on monitored communications between users in real time which indicate a positive or negative reaction to content,
        create a comparative viewing index by comparing the user's viewings to a friend's viewings over a set period, and
        create a ranked list of recommended content programs for the user based on: (1) relationships with other users and their comparative viewings as provided by the comparative viewing index, (2) user demographics (age, gender, other), (3) program genre interests (sports, documentaries, other genres), and (4) location;
    wherein the captured audio samples from the user mobile device are captured based on recording sound using the user mobile device at a recording location of the user, and
    wherein the recording location of the user changes as the user carries and moves the user mobile device between different geographic locations.

2. The system and software module of claim 1, wherein the said elements are further configured to use on-screen user device prompts to allow users to choose and connect with related users (friends) from whom the user seeks to get and share information on what to watch, including leveraging available friends and contacts list information on user devices.

3. The computer system and software module of claim 1, wherein the said elements are also configured to communicate current (and historical) user viewing information between related user devices on the system, and provide other related program information on system servers including, viewing platforms, program schedules and program details derived simultaneously from system metadata servers.

4. The computer system and software module of claim 1, wherein the said elements are further configured and augmented to compare historical viewing by related users on the system to create related viewing indexes as an aid to users to weigh viewing by related users in determining what to watch, comprising application software to analyze viewing data and compare related users viewing habits,
    wherein the system and application software elements are configured to:
        create related user viewing indexes to weight the similarity of viewing habits of these users and an initial user,
        incorporate comparative indexes against viewed content shared with related users on the system,
        share individual user ratings with related users on the system, and
        record data on the system database servers flagged by user and content identification.

5. The computer system and software module of claim 1, wherein the said systems are used to develop individualized system generated program ratings, wherein one or more of the said software applications and server software systems are further configured to:
    search for and retrieve program viewing histories from database servers for individual related users using the content title and associated user (viewer),
    calculate levels of (individual) user interest in specific content based on factors including, current and historical viewing, total time watched and frequency of viewing, create a system-generated program rating for this video content by different weightings of the viewing interest factors, communicate individual user ratings with related users tagged to specific content via internet protocol networks and, record content information and ratings on system database servers flagged by user and content title.

6. The computer system and software module of claim 5, such that the said software applications and systems are further configured to prompt the user to make specific ratings choices for currently viewed programs based on information displayed to the user including, current viewing duration, repeat viewings and other personal preferences, and the system provides options on screen for the user to choose and input such ratings directly, which are likewise tagged to specific content shared with related users.

7. The computer system and software module of claim 1, wherein the said elements are augmented by new application software configured to create direct on-network communications options (to allow discussions about programming content) between related users including, voice calls and text messaging, and to monitor and record data from said voice and text communications onto system database servers for later analysis.

8. A computer implemented system for analyzing communications between users on the system to determine user viewing sentiment of a user using a user mobile device based on recorded communications data tied to specific content viewed by one or more related users on the system, comprising:

key-word identification software used to identify text message, video and voice communications relating to specific content (programs) being discussed between users and determine a direction (positive or negative) of sentiment towards the content and a level of intensity of the sentiment, artificial intelligence software for detailed analysis and trends in identified program related comments, and application software to create report outputs and lists for sharing with the one or more related users on the system, wherein said system and software are configured to:

record viewing and related information by users to computer readable databases, and use actual viewing times in minutes, percentage of total program run-time viewed, and previous repetitive viewing to produce an estimated individual rating for a particular program, calculate individual program sentiment measurements (sentiment scores), including sentiment direction (positive or negative) towards the content (programs), and sentiment intensity levels based on monitored communications between users in real-time which indicate a positive or negative reaction to the content, create rankings of recently viewed content by the one or more related users' sentiment levels, create indexes for specific content based on sentiment analysis outputs, create a comparative viewing index by comparing the user's viewings to a friend's viewings over a set period, create a ranked list of recommended programs for the user based on: (1) relationships with other users and their comparative viewings as provided by the comparative viewing index, (2) user demographics (age, gender, other), (3) program genre interests (sports, documentaries, other genres), and (4) location, communicate program sentiment rankings and indexes with other related users via internet protocol networks tagged to individual content titles viewed, and record content related sentiment measurements for individual programs in system database servers;

wherein the one or more related users are selected by the user from a current friends list stored on the user mobile device of the user.

9. A computer implemented system for collecting and analyzing user viewing data and other related information of a user using a user mobile device, whereas the system is further configured to assist and develop real-time program recommendations for specific content by users, comprising:

a software application utilizing artificial intelligence inputs to analyze currently viewed content and produce an estimated individual rating for a particular program based on actual viewing times in minutes, percentage of total program run-time viewed, and previous repetitive viewing, wherein the software application is further configured to:

initiate on-screen prompt for user input to the user mobile device if content triggers system defined criteria for the viewing recommendations process, display a list of suggested recommendation messages via the user mobile device for the user to check (or enter personal comments) and share with other related users, transmit chosen recommendation messages to selected users via internet protocol network connections on the system, a process to record recommendations for the specified content on system database servers for subsequent data aggregation or detailed viewing analysis for users, create a comparative viewing index by comparing the user's viewings to a friend's viewings over a set period, and create a ranked list of recommended programs for the user based on: (1) relationships with other users and their comparative viewings as provided by the comparative viewing index, (2) user demographics (age, gender, other), (3) program genre interests (sports, documentaries, other genres), and (4) location;

wherein the selected users are selected by the user from a current friends list stored on the user mobile device of the user.

10. A software implemented method for creating advanced forms of personalized program rankings based on individual user preferences for a user using a user mobile device, including rankings tied to user relationships with other users, user demographics, program genres, viewing location, and group versus individual viewing, comprising the steps of:

entry of user viewing profiles for one or more alternate types of viewing, wherein different lists of preferred programs are generated for the user based on the different viewing profiles, identification of different profiles for different times of day or days of the week, wherein different lists of preferred programs are generated based on the different time dependent profiles, application by user of other filter options for new viewing profiles already set up, produce an estimated individual rating for a particular program based on actual viewing times in minutes, percentage of total program run-time viewed, and previous repetitive viewing, and create a new program ranking list to be sent to the user mobile device and displayed on a device screen of the user mobile device, create a comparative viewing index by comparing the user's viewings to a friend's viewings over a set period, and create a ranked list of recommended programs for the user based on: (1) relationships with other users and their comparative viewings as provided by the comparative viewing index, (2) user demographics (age, gender, other), (3) program genre interests (sports, documentaries, other genres), and (4) location;

wherein the friend is selected by the user from a current friends list stored on the user mobile device of the user.

11. The computer system and software module of claim 1, wherein the content is automatically identified using an audio fingerprinting system.

12. The computer system and software module of claim 1, wherein data reflecting communications between users related to user viewed content is recorded and analyzed using key-word analysis software to identify and sort communications related to the user viewed content and to produce content sentiment scores.

13. The computer system and software module of claim 1, wherein the recording location of the user changes contemporaneously with the user's location as the user carries and moves the user mobile device between different geographic locations.

14. The computer system and software module of claim 1, wherein capturing audio samples at the recording location of the user includes recording sound using a microphone of the user mobile device that is a smartphone or a tablet of the user.

15. The computer system and software module of claim 1, further comprising verifying an identity of the user viewing the content via the user mobile device based on a phone number of the user mobile device.

16. The computer system and software module of claim 1, wherein the related users are selected by the user from a current friends list stored on the user mobile device that is a smartphone or a tablet.

17. The computer system and software module of claim 8, further comprising verifying an identity of the user based on a phone number of the user mobile device.

18. The computer system and software module of claim 8, wherein the user mobile device is a smartphone or a tablet.

19. The computer system and software module of claim 9, further comprising verifying an identity of the user based on a phone number of the user mobile device.

20. The computer system and software module of claim 10, further comprising verifying an identity of the user based on a phone number of the user mobile device.

* * * * *